United States Patent

Carman

[15] 3,696,288

[45] Oct. 3, 1972

[54] OPTICALLY COUPLED CONTROL CIRCUIT

[72] Inventor: Richard Jan Carman, Houston, Tex.

[73] Assignee: Cameron Iron Works, Inc., Houston, Tex.

[22] Filed: May 8, 1970

[21] Appl. No.: 35,670

[52] U.S. Cl. ....................323/21, 317/13 R, 317/46, 318/333, 323/22 T, 323/25

[51] Int. Cl. ..........................G05f 1/44, H02p 13/16

[58] Field of Search...317/13, 14, 46, 58, 13 B, 14 C, 317/14 H; 318/313, 480, 333; 323/21, 22 T, 25; 322/26

[56] References Cited

UNITED STATES PATENTS

| | | | |
|---|---|---|---|
| 3,307,076 | 2/1967 | Park | 317/13 R X |
| 3,428,865 | 2/1969 | Opad | 317/46 X |
| 3,360,713 | 12/1967 | Howell | 323/21 |
| 3,463,990 | 8/1969 | Ross | 323/21 |
| 3,531,684 | 9/1970 | Nuckolls | 323/21 X |
| 3,584,259 | 6/1971 | Traub et al. | 317/46 |

*Primary Examiner*—Gerald Goldberg
*Attorney*—Hyer, Eickenroht, Thompson & Turner

[57] ABSTRACT

In a multi-phase power supply, a separate light-actuated semi-conductor switch is located in every line but one. An overload sensor is coupled to the remaining line, and upon the occurrence of an overload, emits a light signal that opens the light-sensitive switches in the other lines.

18 Claims, 2 Drawing Figures

Richard Jan Carman
INVENTOR

BY
G. Donald Weber, Jr.
ATTORNEY

Richard Jan Carman
INVENTOR.

BY

G. Donald Weber, Jr.
ATTORNEY

OPTICALLY COUPLED CONTROL CIRCUIT

BACKGROUND

In many areas, it is desirable to be able to control a utilization device such as a motor or the like without interaction between the motor and the control circuitry. Moreover, many utilization devices such as motors have three phase inputs and it is desirable to prevent interaction between the several phases of the supply source. There are many reasons for preventing the interaction, as for example, inadvertent short circuiting of the phases could occur.

SUMMARY OF THE INVENTION

While not limited to a control circuit for a multiphase motor, the subject invention assures electrical isolation of each of the three phase power lines supplying a motor and, further, provides electrical isolation between the power lines and the overall circuitry. Electrical isolation is provided by utilizing an optical coupling technique wherein a suitable solid state light emitting device controls the operation of a solid state light sensitive device. The amount of light emitted by the light emitting device is controlled by logic circuitry utilizing solid state or integrated circuit components. The light sensitive device controls the operation of a suitable switch connected in line with a particular power or drive line.

DESCRIPTION OF THE PREFERRED EMBODIMENT

Figure 1:
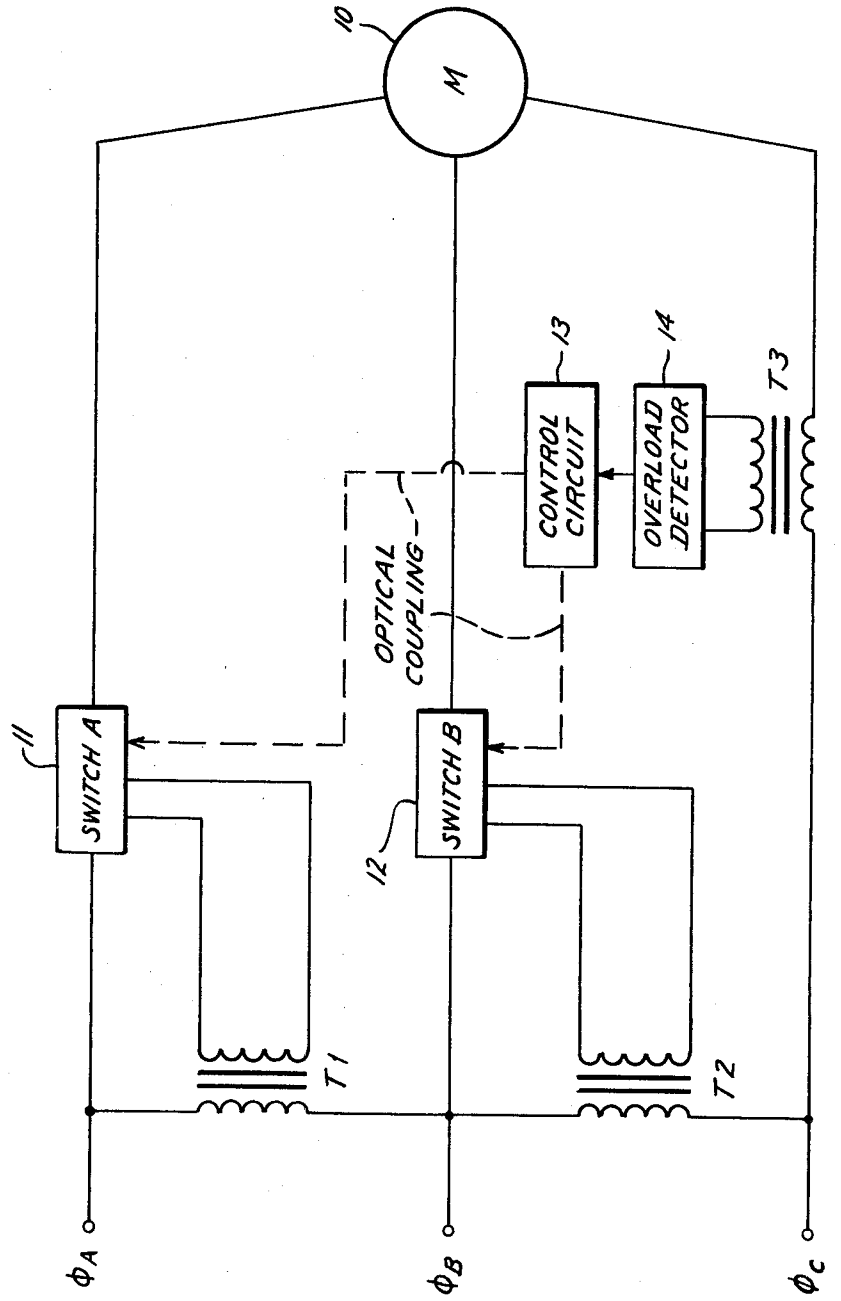
FIG. 1 is a partially block diagram, partially schematic representation of the control system.

Referring now to FIG. 1, a suitable utilization device such as three phase motor 10 is the device which is to be controlled. The particular control to be effected is the selective stopping or starting of the three-phase AC motor. Control is to be effected by using standard 5 volt digital logic signals. The three phase power supply may be any suitable supply source. The source supplies power having phases $\phi_A$,$\phi_B$, and $\phi_C$. As shown, phase $\phi_C$ is connected directly to motor 10 via the serial connection of the primary winding of transformer T3. Phase $\phi_B$ is connected to motor 10 via switch 12; while phase $\phi_A$ is connected to motor 10 via switch 11. Thus, when switches 11 and 12 are closed, the three phase power is supplied to motor 10. However, when switches 11 and 12 are opened, motor 10 is, effectively, rendered inoperative.

Transformer T1 has the primary winding thereof connected between power lines phase $\phi_A$ and $\phi_B$. The secondary winding of transformer T1 is connected to switch 11. Transformer T1 is a step-down transformer and provides a suitable power supply for switch 11.

The primary winding of transformer T2 is connected between power lines phase $\phi_B$ and $\phi_C$. The secondary winding of transformer T2 is connected to switch 12. Transformer T2 is similar to transformer T1 whereby an appropriate power supply is provided for switch 12.

Control circuit 13 is connected to one input of switch 11 and to one input of switch 12. Control circuit 13 includes suitable logic circuits and command circuitry so that the operation of switches 11 and 12 is controlled thereby. As will become apparent hereinafter, control circuit 13 may be operated automatically or manually.

The secondary winding of transformer T3 is connected to an overload detector circuit 14. Any current overload condition relative to motor 10 is detected by overload detector 14. The output of detector circuit 14 is connected as an input to control circuit 13. Thus, if a current overload is detected in the phase $\phi_C$ power line, an appropriate signal is supplied to control circuit 13 to override the normal operation thereof, if necessary, to open switches 11 and 12 to prevent damage to motor 10. Thus, appropriate power is supplied to switches 11 and 12 via the respective transformers T1 and T3. Suitable control signals to determine the condition of switches 11 and 12 are supplied by control circuit 13 which may be manually or automatically operated. Control circuit 13 can be overridden by the overload detector 14. Thus, operation of motor 10 is controlled by the condition of switches 11 and 12.

Figure 2:
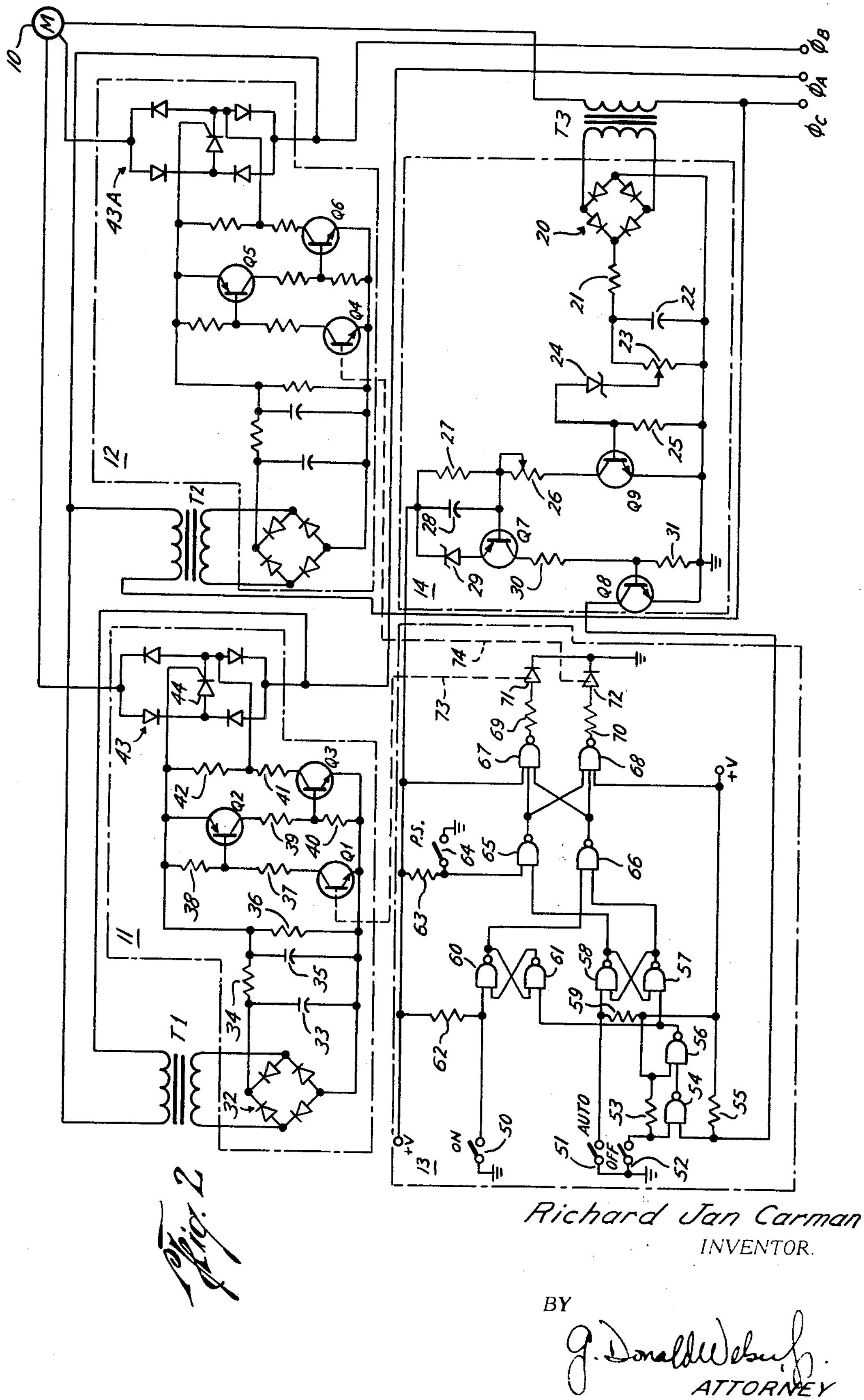
FIG. 2 is a schematic diagram of the control system shown in FIG. 1.

Referring now to FIG. 2, there is shown a schematic diagram of the instant control system. In FIG. 2, components which are similar to components shown in FIG. 1 bear similar reference numerals. Thus, motor 10 is connected to phase $\phi_C$ via the primary winding of transformer T3. The secondary winding of transformer T3 is connected to overload detector circuit 14. More specifically, the opposite ends of secondary winding of transformer T3 are connected to the opposing nodes of diode bridge 20. The other pair of opposing nodes of bridge 20 are connected across the series combination of resistor 21 and capacitor 22. The common junction of capacitor 22 and the node of diode bridge 20 is further connected to a suitable reference potential, for example, ground. The junction between resistor 21 and capacitor 22 is connected to one end of variable resistor 23, the other end of which is returned to ground. The variable tap of resistor 23 is connected to the cathode of Zener diode 24. The anode of diode 24 is connected to ground by resistor 25. The anode of diode 24 is further connected to the base of NPN transistor Q9. The emitter of transistor Q9 is connected to ground while the collector thereof is connected to a suitable source, for example, +5 volts via variable resistor 26 and resistor 27.

The base electrode of PNP transistor Q7 is connected to the common junction between resistors 26 and 27 while capacitor 28 is connected in parallel with resistor 27. The emitter of transistor Q7 is connected to the anode of Zener diode 29 which has the cathode thereof returned to the +5 volt source. The collector of transistor Q7 is connected via resistors 30 and 31 to ground. The base of NPN transistor Q8 is connected to the common junction between resistors 30 and 31. The emitter of transistor Q8 is returned to ground while the collector electrode is connected to supply the output signal of overload detector circuit 14 to control circuit 13 as will be described hereinafter.

Overload detector circuit 14 operates to detect a current overload condition in the phase $\phi_C$ line such as occurs when motor 10 is jammed or the like. In this instance, an AC signal is supplied across transformer T3 to diode bridge 20 to provide a unipolar signal. This alternating signal is applied to the smoothing network comprising resistor 21 and capacitor 22 to provide a signal having only a small ripple. This rectified signal is applied across variable resistor 23 which acts as an adjustable setting for the remainder of the circuit. When the potential across resistor 23 reaches a pre-determined level, Zener diode 24 conducts in the reverse direction and supplies a relatively positive signal to the base of transistor Q9. With the relatively positive signal applied to the base thereof, transistor Q9 becomes conductive thereby completing the series network including resistors 26 and 27 whereby current flow produces a voltage drop across these resistors. When the voltage drop across resistor 26 attains the appropriate level, transistor Q7 is turned on to complete the circuit including resistors 30 and 31. Capacitor 28 must be charged sufficiently to attain the appropriate voltage level to operate transistor Q7. Thus capacitor 28 along with resistors 26 and 27 provide a delay circuit so that momentary overloads do not cause transistor Q7 to become conductive. It should be noted that Zenor diode 29 is inserted to control the operating threshold voltage for transistor Q7. When transistor Q7 is conductive, the potential across resistor 31 becomes effective to render transistor Q8 conductive. The collector of transistor Q8 is then effectively clamped at ground potential and provides a logic level signal (e.g., binary O) to control circuit 13. Obviously, a different logic level signal (e.g., binary O) to control (e.g., binary 1) is supplied to control circuit 13 by overload detector circuit 14 in the absence of an overload condition at motor 10. That is, without an overload condition, transistors Q7, Q8 and Q9 are nonconductive. In this condition the output of detector 14 is not grounded.

The primary A of transformer T1 is connected between phase $\phi_A$and $\phi_B$. The secondary winding is connected across one pair of opposing nodes of diode bridge 32. The other pair of opposing nodes of diode bridge 32 are connected across capacitor 33. The combination of resistor 34 and capacitor 35 are connected across capacitor 33. Resistor 36 is connected across capacitor 35. The common junction associated with one node of diode bridge 32 and terminals of resistor 36 along with capacitors 33 and 35 is a relatively negative terminal. This terminal is connected to the emitter of transistor Q1 which is a light sensitive transistor. The collector of transistor Q1 is connected via resistors 37 and 38 to the relatively positive potential bus supplied via resistor 34, at the other terminal node of diode bridge 32. It should be noted that this circuit is electrically "floating" without a common ground to the remainder of the system. The common junction between resistors 37 and 38 is connected to the base of PNP transistor Q2. The emitter of transistor Q2 is connected to the positive bus while the collector electrode of transistor Q2 is connected to the relatively negative bus by resistors 39 and 40. The common junction of resistors 39 and 40 is connected to the base of transistor Q3 which has the emitter thereof connected to the negative bus. The collector of transistor Q3 is connected to the positive bus via resistors 41 and 42. The common junction between resistors 41 and 42 is connected to the cathode of silicon control rectifier (SCR) 44. The gate electrode of SCR 44 is connected to the positive bus. The anode of SCR 44 is connected to one node of diode bridge 43 while the cathode thereof is connected to the opposite node. The other pair of opposing nodes of diode bridge 43 is connected, in series, with the phase $\phi_A$ power line which is supplied to motor 10.

In operation, the single phase signal between power lines $\phi_A$ and $\phi_B$ is presented across the primary winding of transformer T1. Transformer T1 is a step-down transformer in this embodiment. Typically, the secondary voltage of transformer T1 is about 6.3 volts AC. This signal is applied across opposing nodes of diode bridge 32 and converted into a single polarity signal. The unidirectional pulsating signal from diode bridge 32 is applied across the filter network including capacitors 33 and 35 and resistor 34. Thus, a suitable, substantially DC signal is supplied to the amplifier portion of switch circuit 11. Therefore, depending upon the condition of transistor Q1, diode bridge 43 may pass a signal therethrough. For example, if transistor Q1 is rendered conductive, current flow through the associated circuit branch produces a potential drop across resistors 37 and 38 whereby transistor Q2 is rendered conductive. When transistor Q2 is conductive, this circuit path permits current flow whereby the voltage drop across resistor 40 causes transistor Q3 to be rendered conductive. When transistor Q3 is conductive, current flows therethrough so that the voltage drop across resistor 42 is sufficient to cause SCR 44 to be rendered conductive. When SCR 44 is conductive, diode bridge 43 conducts the AC signal therethrough and supplies one of the phase signals to motor 10.

Conversely, when transistor Q1 is nonconductive (as controlled by the light supplied thereto), transistors Q2 and Q3 are rendered nonconductive whereby SCR 44 is also nonconductive. When SCR 44 is nonconductive, diode bridge 43 cannot pass the AC signal therethrough to motor 10.

Switch circuit 12 is substantially similar in circuit configuration to switch circuit 11. A detailed description and discussion thereof is deemed unnecessary. However, as will be noted, diode bridge 43A of switch circuit 12 is connected, in series, with the phase $\phi_B$ power line to motor 10. Thus, as can be seen, the phase $\phi_A$ and phase $\phi_B$ power lines to motor 10 are controlled by switch circuit 11 and 12, respectively. If each of these circuits is rendered nonconductive, the single phase $\phi_C$ power line which is connected directly to motor 10 via transformer T3 will be insufficient to maintain motor 10 in the operative condition.

Control of the operation of switches 11 and 12 is provided by control circuit 13. In the embodiment described herein, control circuit 13 is a logic circuit which is controlled by or receptive of at least 4 input signals. The input signals may be supplied by means of single throw switches as shown. In the alternative, the input signals may represent logic level input signals from other circuitry. However, the type of input signal does not significantly alter the operation of control circuit 13.

The input signals are supplied by switches 50, 51, 52 and 64. Each of the switches selectively applies a ground potential or binary logic signal to the circuit. Switch 50 is connected to the ON terminal for manually (or by suitable control circuitry) turning on motor 10. Switch 51 is connected to the AUTO terminal for automatic operation. SWitch 52 is connected to the OFF terminal wherein motor 10 is turned off when switch 52 is closed. Switch 64 supplies a pressure switch input signal in the event that the control circuit is regulated by pressure in a pressure vessel or the like. In addition, a "shut down control" is supplied to control circuit 13 from overload detector circuit 14. This signal is typical of a logic level type input signal as suggested supra.

A suitable energy source is provided where a potential of +V (with respect to ground) is supplied to the system. Resistor 62 is connected between the +V source and the one input of NAND 60. This same input is connected to the ON terminal associated with switch 50. Gate 60 and NAND gate 61 are connected together to provide a flipflop network. Thus, the output of gate 60 is connected to one input of gate 61 while the output of gate 61 is connected to another input of gate 60. The output of gate 60 is also connected to one input of gate NAND 66. The second input of gate 61 is connected to the output of NAND gate 56 and the input of NAND gate 57. One input of gate 56 is supplied directly from the output of gate 54. Another input of gate 56 is connected via resistor 53, to the OFF input terminal which is also connected to an input of NAND gate 54. When switch 52 is closed, these inputs of gates 54 and 56 are grounded. The AUTO input terminal is connected, via resistor 59, to the second input of gate 56. This same input of gate 56 is further connected to the +V source directly. A second input of gate 54 is connected to the shutdown control circuit supplied by overload detector circuit 14. In addition, the second input of gate 54 is connected via resistor 55, to the +V terminal.

Gate 58 also has one input connected directly to the AUTO terminal. Gates 57 and 58 are connected together as a flipflop. Thus, the output of gate 57 is connected to a second input of NAND gate 58 while the output of gate 58 is connected to a second input of gate 57. The outputs of gates 57 and 58 are connected to inputs of NAND gates 66 and 65, respectively. Thus, gate 66 receives an input from gate 60 and gate 57. The other input of gate 65 is connected, via resistor 63, to the +V source. In addition, the second input of gate 65 is connected directly to pressure sensitive switch 64. The output of gate 65 is connected directly to one input of gate 67 and to one input of gate 68. The output of gate 66 is connected directly to one input of gate 67 and to an input of gate 68. A third input of NAND gates 67 and 68 are connected to the +V source. The output of gate 67 is connected via resistor 69 to the anode of light emitting diode 71. The output of gate 68 is connected via resistor 70 to the anode of light emitting diode 72. The cathodes of diodes 71 and 72 are connected to ground or other suitable reference source.

Diodes 71 and 72 are standard light emitting diodes which are known in the art. Diode 71 is associated with or coupled to transistor Q1 (switch 11) while diode 72 is associated with or optically coupled to transistor Q4 (switch 12). Transistors Q1 and Q4 are known as optically sensitive transistors. The optical coupling between the respective diode and transistor can be effected in any suitable manner. For example, the diode and associated transistor may be bonded together by a suitable agent, or fiber optic pipes may be utilized to conduct the light from the diode to the associated transistor.

As discussed supra, each of light sensitive transistors Q1 and Q4 are rendered conductive as a function of the amount of light supplied thereto. In the instant embodiment, the greater the light applied to the transistor, the more conductive the transistor. Consequently, conduction by diode bridges 43 and 43A is, ultimately, controlled by the conduction or not of diodes 71 and 72. The conduction of the diodes is a function of the logic circuit and the signals supplied thereto.

If now it is assumed that switch 52 is closed thereby supplying the OFF signal, a binary (i.e., ground potential) is supplied to one input of gate 54. Since gate 54 is a NAND gate (as are all the other gate circuits in control circuit 13), a binary 0 at any input produces a binary 1 at the output of the particular gate. Consequently, regardless of the application of a +V signal to the other input of gate 54, the output of this gate is a binary 1. This binary 1 signal is supplied to one input of gate 56. Moreover, a binary 1 is supplied to the other input of gate 56 across resistor 53. That is, resistor 53 provides isolation between the input of gate 56 and the OFF terminal. Normally, resistor 53 serves to maintain the input of gate 54 at the binary 1 level when switch 52 is open.

Since gate 56 has two binary 1 inputs supplied thereto, a binary 0 output is produced thereby and supplied to one input of gate 57 and one input of gate 61. Since switch 51 is open, a binary 1 signal is supplied to a first input of gate 58 via resistor 59. Since gate 57 has a binary 0 supplied to one input thereof, a binary 1 is produced thereby and supplied to the other input of gate 58 and to one input of gate 66. Since gate 58 has binary 1 signals supplied to all inputs, the output thereof is a binary 0 which is returned to another input of gate 57 thereby locking the flipflop comprising gates 57 and 58 in the condition described. Moreover, the binary 0 output of gate 58 is supplied to one input of gate 65. Since gate 65 receives at least one binary 0 input, a binary 1 output is provided thereby and supplied to one input of each of gates 67 and 68. Another input of each of gates 67 and 68 is supplied by the +V terminals whereby binary 1 signals are continuously supplied.

Referring to the flipflop comprising gates 60 and 61, gate 61 receives a binary 0 input signal from gate 56. Likewise, one input of gate 60 is a binary 1 input supplied by the +V source via resistor 62. Since gate 61 produces a binary 1 output as a result of the binary 0 input, gate 60 receives two binary 1 inputs thereby producing a binary 0 output. The binary 0 output of gate 60 is supplied to another input of gate 61 to latch the flipflop and, as well, to an input of gate 66. The binary 0 input at gate 66 causes this gate to produce a binary 1 output which is supplied to the remaining input of gates 67 and 68. Since gates 67 and 68 each receive all binary 1 inputs, these gates produce binary 0 outputs. Signals representative of binary 0 (i.e., low level logic signals) are supplied via resistors 69 and 70 to diodes 71 and 72, respectively. Since the binary 0 signal is defined as a negative potential (relative to the binary 1 signal), for example, approximately ground potential, diodes 71 and 72 are nonconductive. When these diodes are nonconductive, little or no light is emitted thereby such that transistors Q1 and Q4 are not rendered conductive and diode switches 43 and 43A remain nonconductive.

In an alternative operation, assume that switch 52 is open and ON switch 50 is closed. Thus, a ground or binary 0 signal is supplied to one input of gate 60. The binary 0 input signal causes gate 60 to produce a binary 0 output which is supplied to one input of each of gates 61 and 66. Referring now to gate 54, a binary 1 input signal supplied to each of the inputs from the +V terminal via resistors 53 and 55, respectively. Thus, a binary 0 output is provided thereby and supplied to one input of gate 56. Gate 56 produces a binary 1 output signal (as a result of the binary 0 input) and supplies the binary 1 output signal to another input of gate 61 and to one input of gate 57. The binary 1 signal supplied to gate 61 causes the flipflop comprising gates 60 and 61 to latch in the condition prescribed by the closure of switch 50. Since a binary 1 signal is supplied to an input of each of gates 57 and 58, the prior history controls the operation of this flipflop. Since the circuit has just been turned ON, it is assumed that the prior condition was the OFF condition.

When the circuit was in the OFF condition, a binary 0 signal was applied to an input of gate 57 wherein a binary 1 was produced thereby. This binary 1 was supplied to an input of gate 58. With the change of condition at the output of gate 56 from a binary 0 to a binary 1, gate 57 would continue to produce a binary 1 output inasmuch as gate 58 was supplying a binary 0 to the other input of gate 57. Thus, the binary 1 output of gate 57 remains the same and is applied to an input of gate 66. Thus, gate 66 receives binary 1 inputs from gates 60 and 57 and produces a binary 0 output which is supplied to one input of each of gates 67 and 68. Thus, gates 67 and 68 produce binary 1 output signals which are defined to be on the order of a sufficiently positive potential to cause diodes 71 and 72 to conduct. When diodes 71 and 72 conduct, light which is sufficient to render transistors Q1 and Q4 operative, is emitted thereby.

For completeness, it may be understood that the flipflop comprising gates 57 and 58 may have a previous history which reflects an automatic or AUTO setting when the circuit is switched to the ON position. However, since the flipflop is a set-reset type, and since switch 51 is momentarily operated, similar operation would occur. That is, a binary 0 is only momentarily supplied to gate 58 and then a binary 1 is reapplied. Gate 58 continues to produce a binary 1 output since gate 57 supplies a binary 0 to gate 57. Thus, gate 65 receives two binary 1 inputs and, thus, produces a binary 0 output which is supplied to an input of each of gates 67 and 68. So long as gates 67 and 68 each receive a binary 0 input, the outputs produced thereby are binary 1 signals and are sufficient to render diode 71 and 72 conductive.

If now the circuit is placed in the AUTO operating condition, switch 51 is closed and a binary 0 signal is supplied to one input of gate 58. This binary 0 input causes gate 58 to produce a binary 1 output signal which is applied to one input of gate 57 and to one input of gate 65. The binary 1 input signal at gate 65, combined with the other binary 1 supplied via resistor 63 causes gate 65 to produce a binary 0 output signal which is applied to an input of gate 67 and 68 whereby these gates produce binary 1 output signals which render diodes 71 and 72 conductive. As may be seen, a momentary closure of switch 64 will produce a binary 0 at the one input of gate 65 whereby gate 65 produces a binary 1 output signal which is supplied to the inputs of gates 67 and 68. As a result, these gates receive all binary 1 input signals and produce a binary 0 output signal. The binary 0 output signal renders diodes 71 and 72 nonconductive.

If instead of operation of switch 64, overload detector circuit 14 detects an overload condition, transistor Q8 is rendered conductive and supplies a binary 0 signal to one input of gate 54. Consequently, gate 54 produces a binary 1 output signal which is applied to gate 56. Since gate 56 now receives all binary 1 input signals, it produces a binary 0 output signal. The binary 0 output signal is supplied to gates 61 and 57. Each of these gates must now produce a binary 1 output signal. The binary 1 signal produced by gate 57 is supplied to an input of gate 58 and an input of gate 66. Since gate 58 now receives all binary 1 input signals (switch 51 is now open), gate 58 produces a binary 0 output signal which is supplied to gate 57 and latches the flipflop. In addition, the binary 0 signal is supplied to an input of gate 65 to produce a binary 1 output signal. The binary 1 is supplied to gate 67 and 68 whereby these gates each receive all binary 1 input signals and produce a binary 0 output signal whereby diodes 71 and 72 are nonconductive.

It should be clear that the binary 0 signal produced by gate 56 and supplied to gate 61 causes gate 61 to produce a binary 1 output signal which is applied to gate 60. Thus, each of the input signals at gate 60 is a binary 1 whereby gate 60 produces a binary 0 output signal and supplies same to an input of gate 66. As a result, gate 66 continues to produce a binary 1 output and supply this signal as one of the inputs of gates 67 and 68.

Thus, there is shown and described a control circuit wherein electrically isolated and electrically floating switch circuits are inserted in series in power lines. The switches are optically coupled to a control circuit so that the conduction characteristics of the switch circuits can be controlled even though complete electrical isolation between each of the switches and the control circuit is maintained. The control circuit is constructed so that manual control of the system can be obtained by manual operation of on and off switches. In addition, automatic control of the circuit can be selectively achieved. Automatic control can be utilized to render the switches nonconductive in order to prevent overload or other undesirable conditions from continuing whereby system damage could occur. In addition, a pressure switch can be utilized to control the operation of the motor. That is, a pressure switch may be operated by a fluid in a pressure vessel or the like whereby pressure limits may be maintained. For example, the motor which is controlled may, in fact, drive a pump which controls the amount of fluid in a pressure system. When the pressure achieves a certain threshold, a pump motor may be started or stopped as the case may be. Moreover, the system may be utilized to control the motor or pump as a function of the presence or absence of a fluid or gas or the like. That is, if the optical path between the diode and transistor is selectively interrupted by fluid or the like, less sophisticated circuitry controls can be utilized, but the basic concept herein described can be utilized to control the operation of the system.

Thus, there has been described a preferred embodiment of a control circuit. This circuit is utilized to control a motor or the like and to provide complete electrical isolation of the switches and control circuits one from the other. Certain specific components have been described hereinabove. It is to be understood that certain modifications may suggest themselves to those skilled in the art. However, so long as the modifications fall within the purview of the above description and the following claims, the modifications are intended to be included within this invention.

I claim:

1. A power control circuit for controlling the flow of electrical current from a plurality of power lines to a load device, said control circuit comprising, in combination: current responsive means for responding to a predetermined load condition in one of said power lines to provide an output signal; a control circuit responsive to said output signal to provide a control signal; and a switch circuit including a switch electrically isolated from said current responsive means and said control circuit and adapted to be serially connected in only one of the other of said power lines, said switch switchable in response to a triggering signal between a first state permitting the conduction of current to said load device and a second state for interrupting such conduction of current, said switch circuit further including a switch driver circuit electrically isolated from said current responsive means and said control circuit and connected to said switch, said driver circuit responsive to said control signal when provided by said control circuit to provide such a triggering signal to said switch.

2. The power control circuit of claim 1 further including means for conducting said control signal from said control circuit to said switch driver circuit while maintaining electrical isolation between said driver circuit and said control circuit.

3. The power control circuit of claim 1 wherein the type of load device to be controlled by said power control circuit is one connected in a fluid flow system, and wherein said control means includes means adapted to be connected to said fluid flow system for providing said control signal in response to a condition in said fluid flow system.

4. The power control circuit of claim 1 wherein said current responsive means includes delay means for inhibiting response to said predetermined load condition except when said load condition is present for a predetermined period of time.

5. The power control circuit of claim 1 including a plurality of said switch circuits each including a switch adapted to be serially connected in only one of said other of said power lines, each of said switch circuits electrically isolated from each other, said control circuit and said current responsive means, and a plurality of said switch driver circuits each connected to only one of said switches and electrically isolated from each other, said control circuit and said current responsive means.

6. The power control circuit of claim 5 further including means for conducting said control signal from said control circuit to each of said switch driver circuits while maintaining electrical isolation between said switch driver circuits and said control circuit.

7. The power control circuit of claim 5 wherein each of said switches includes a diode bridge circuit and an SCR connected to permit conduction of current through said diode bridge circuit.

8. The power circuit of claim 5 wherein said control signal is a light signal and said control circuit includes light emitting means for providing said light signal in response to said output signal, and said switch driver circuits each include light responsive means optically coupled to said light emitting means for responding to light signals form said light emitting means.

9. The power control circuit of claim 8 wherein said light responsive means is a light sensitive semiconductor device.

10. The power control circuit of claim 1 wherein said control signal is a light signal and said control circuit includes light emitting means providing said light signal in response to said output signal, and said switch driver circuit includes light responsive means optically coupled to said light emitting means for responding to light signals form said light emitting means.

11. The power control circuit of claim 10 wherein said light responsive means is a light sensitive semiconductor device.

12. The power control circuit of claim 10 wherein said predetermined load condition is a current overload, and said light emitting means provides said light signal in absence of said overload, and wherein said switch driver circuit responds to the absence of said light signal to cause said switch means to interrupt the flow of current to said load.

13. A power control circuit for controlling the application of power from a plurality of power lines in a multi-phase power line system to a load device, comprising, in combination: control means for responding to a predetermined operating condition of said load device to provide a control signal, said control means being electrically isolated from at least one line of any pair of said power lines, and a plurality of separate switch circuits each adapted to be connected to control the flow of electrical current in only one of said power lines to said load device, each of said switch circuits electrically isolated from said control means and the other switch circuits and each including a switch connected in the respective only one of said power lines and switchable in response to a trigger signal from a first state permitting such flow of electrical current to a second state for interrupting such flow of electrical current, each of said switch circuits further including a switch driver circuit connected to the respective switch and responsive to said control signal to provide said trigger signal.

14. The power control circuit of claim 13 wherein a switch is provided for each of all but one of said power lines and said control means includes means adapted to respond to a predetermined current condition in one of said power lines to provide said control signal.

15. The power control circuit of claim 14 wherein the type of load device to be controlled by said power control circuit is one connected in a fluid flow system, and wherein said control means also includes means adapted to respond to a predetermined fluid flow condition in said fluid flow system to provide said control signal.

16. The power control circuit of claim 13 wherein the type of load device to be controlled by said power control circuit is one connected in a fluid flow system and said control means includes means adapted to respond to a predetermined fluid flow condition in said fluid flow system to provide said control signal.

17. The power control circuit of claim 16 wherein said last mentioned means includes a pressure switch for responding to a fluid pressure condition in said fluid flow system.

18. An overload control circuit for controlling the application of power from a plurality of power lines in a multi-phase power line system to a load device, comprising, in combination: separate light responsive solid state switching means each adapted to be connected to one of all but one of said multi-phase lines to permit the conduction of current to a load, each such switching means switchable between a state permitting conduction of current to said load device and a state interrupting such conduction of current and being responsive to receipt at an input of a light signal to change between such states; sensor means for sensing a predetermined current condition in said but one of the multi-phase lines; and control means connected to said sensor means and responsive thereto to emit a light signal when a predetermined change in a current condition in said one line is sensed, said light signal being coupled to said input of each of said switching means.

* * * * *